(12) United States Patent
Siriwardane et al.

(10) Patent No.: US 11,433,385 B1
(45) Date of Patent: Sep. 6, 2022

(54) ENCAPSULATION METHOD FOR PREPARATION OF PELLETS WITH HIGH ATTRITION RESISTANCE

(71) Applicant: Energy, United States Department of, Washington, DC (US)

(72) Inventors: Ranjani Siriwardane, Morgantown, WV (US); Jarrett Riley, Morgantown, WV (US)

(73) Assignee: Energy, United States Department of, Washington, DC (US)

( * ) Notice: Subject to any disclaimer, the term of this patent is extended or adjusted under 35 U.S.C. 154(b) by 537 days.

(21) Appl. No.: 16/570,403

(22) Filed: Sep. 13, 2019

(51) Int. Cl.
| | |
|---|---|
| *B01J 20/12* | (2006.01) |
| *B01J 37/08* | (2006.01) |
| *B01J 37/04* | (2006.01) |
| *B01J 20/30* | (2006.01) |
| *B01J 21/16* | (2006.01) |
| *B01J 20/08* | (2006.01) |
| *B01J 35/02* | (2006.01) |
| *B01J 23/89* | (2006.01) |
| *B01J 20/16* | (2006.01) |

(52) U.S. Cl.
CPC ............ *B01J 37/08* (2013.01); *B01J 20/08* (2013.01); *B01J 20/12* (2013.01); *B01J 20/165* (2013.01); *B01J 20/3078* (2013.01); *B01J 21/16* (2013.01); *B01J 23/8906* (2013.01); *B01J 35/026* (2013.01); *B01J 37/04* (2013.01)

(58) Field of Classification Search
CPC ...... B01J 20/12; B01J 20/165; B01J 20/3078; B01J 20/08; B01J 21/16; B01J 23/8906; B01J 35/0006; B01J 35/0086; B01J 35/023; B01J 35/026; B01J 37/0221; B01J 37/0223; B01J 37/0234; B01J 37/08

USPC .............................................. 502/80, 84, 85
See application file for complete search history.

(56) References Cited

U.S. PATENT DOCUMENTS

| | | | | |
|---|---|---|---|---|
| 2017/0267605 | A1* | 9/2017 | Tanur | B01J 35/0006 |
| 2019/0381488 | A1* | 12/2019 | Lambert | B01J 35/108 |
| 2019/0388874 | A1* | 12/2019 | Lambert | B01J 35/109 |

OTHER PUBLICATIONS

Kidambi et al., "Interaction of Iron Oxide with Alumina in a Composite Oxygen Carrier during the Production of Hydrogen by Chemical Looping", Energy & Fuels, 26, 2012, pp. 603-617.*
Insley et al., "Thermal Behaviour of the Kaolin Minerals," Journal of Research of the National Bureau of Standards, 1935, vol. 14, pp. 615-627.

* cited by examiner

*Primary Examiner* — Elizabeth D Wood
(74) *Attorney, Agent, or Firm* — Aaron R. Keith; Jacob A. Heafner; Michael J. Dobbs

(57) ABSTRACT

This disclosure provides a method to produce highly attrition resistant pellets by encapsulating reactive components in a vitrified clay outer layer. The reactive component mixture is present relative to the clay substrate in a weight ratio of part per 60-100 part to about 60 parts of the clay substrate. The reactive components are agglomerated first, and clay substrate is added to form the outer layer of the pellet. The pellets are calcined at temperatures above 1200 C to form a vitrified clay semi porous outer layer providing high strength to the pellet while facilitating the gas transfer for the reaction with the encapsulated reactive components. Pellets containing $CuO$—$Fe_2O_3$-alumina oxygen carrier for chemical looping combustion of fuel demonstrated high attrition resistance and high reactivity with methane.

20 Claims, 14 Drawing Sheets

ENCAPSULATION METHOD FOR PREPARATION OF PELLETS WITH HIGH ATTRITION RESISTANCE

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to fabrication of solid composite pellets having high attrition resistance suitable for as catalysts, sorbents and oxygen carriers in fluidized bed, moving bed, fixed bed and transport bed reactor systems. More specifically, one or more embodiments relate to preparation of oxygen carriers by encapsulating reactive metal oxide oxygen carriers in a strong outer layer of vitrified inactive clay mineral.

BACKGROUND OF THE INVENTION

Processes involving pelletized catalysts, sorbents and oxygen carriers operating in fluidized beds or circulating fluidized beds require highly attrition resistant materials for long term operations because the materials are transported continuously through the reactors during the operation. Chemical looping combustion is an advanced combustion technology which uses metal oxide-based oxygen carriers to transport oxygen from air to the fuel for combustion. In a fuel reactor, the metal oxide oxygen carrier reacts with fuel gases such as methane or synthesis gas derived from solid fuels to produce a sequestration ready concentrated $CO_2$ stream which avoids costly separation of $N_2$ from $CO_2$. According to the reported systems studies, the high initial cost of the oxygen carriers and further replacement costs are the major barrier issues for commercialization of chemical looping combustion systems. (B. Stevens, R. Newby, V. Shah, N. Kuehn and D. Keairns, "Guidance for NETL's Oxy combustion R&D Program: Chemical Looping Combustion Reference Plant Designs and Sensitivity Studies," ESPA-DOE/NETL, Pittsburgh, 2014). Consequently, the loss of materials due to attrition contributes to these barrier issues and must be minimized.

Pellet attrition can occur due to several reasons. Chemical changes occur as the reactive component in these solid pellets, metal oxide, is reduced during the reaction with fuel in the fuel reactor and oxidized with air in the air reactor at reaction temperatures above 700° C. In addition to the chemical changes within the pellet, the pellets are physically susceptible to attrition as they are transported. Particle-particle collisions, particle reactor wall collisions, and loss through particle recovery cyclones occurs as the pellets are transported through the fuel reactor and air reactor. Particle abrasion, which is removal of the outer layers of the particle, and particle erosion, which involves chipping and fragmentation of the particles, have been identified as the two major modes of attrition.

Various binders such as alumina, silica and cements have been used in the preparation of the oxygen carrier pellets for chemical looping systems. (see A. Lyngfelt, "Oxygen Carriers for Chemical Looping Combustion—4000 h of Operational Experience" Oil Gas Sci. Technol (2011), Vol 66, 2, 161-172; D. Jing, "Innovative Oxygen Carrier Materials for Chemical-Looping Combustion" Energy Procedia (2013), Vol 37, 645-653; H. Tian, K. Chaudhari, T. Simonyi, J. Poston, T. Liu, T. Sanders, G. Veser and R. Siriwardane, "Chemical looping combustion of coal-derived synthesis gas over copper-oxide oxygen carriers," Energy and Fuels, vol. 22, no. 6, pp. 3744-3755, 2008). These binders are inert materials for chemical looping combustion reactions. The binders enhance the pellet strength by promoting the metal oxide powder adhesion. However, the adhesion properties between the metal oxide and the binder may change when there are chemical changes in the metal oxides during the reactions at high temperatures, causing a decrease in the pellet strength. Therefore, additional methods to improve the stability of the pellet strength are necessary to maintain high attrition resistance during reactor operations.

In the present disclosure, one or more embodiments relate to a method of producing pellets having one or more reactive component metal oxide particles encapsulated with a layer of porous vitrified unreactive aluminosilicate. Pellet preparation procedures and attrition resistance tests are described in this disclosure. These and other objects, aspects, and advantages of the present disclosure will become better understood with reference to the accompanying description and claims.

SUMMARY OF THE INVENTION

This disclosure provides a method to produce solid pellets with high attrition resistance for use in reactor operations such as fluidized bed, circulating fluid bed and moving bed reactor operations. Exemplary solid pellets include oxygen carriers as reactive materials for chemical looping combustion. The solid pellets with high attrition resistance comprise reactive materials encapsulated by a porous unreactive outer layer of vitrified aluminosilicate containing clay materials.

The methods for producing the solid pellets may be used for the preparation of catalysts, sorbents, and oxygen carrier solid pellets. An encapsulated oxygen carrier produced using vitrified clay is suitable for chemical looping combustion reactions with fuel gases, such as methane or syngas, to produce heat and sequestration ready $CO_2$. These gases can diffuse freely through the porous vitrified clay layer to reduce an oxygen carrier such as copper oxide and iron oxide while producing a concentrated steam of $CO_2$. When air is introduced to the reduced oxygen carrier, air diffuses through the porous vitrified clay layer to oxidize the reduced metal oxides while producing heat. The reaction rate is not affected by the vitrified clay layer because there is no resistance to the gas diffusion by the porous vitrified clay layer. Compared to an oxygen carrier without encapsulation, the oxygen carrier encapsulated by the method described exhibits stable reactivity and was less susceptible to attrition.

In one embodiment, the highly attrition resistant solid pellets for fluid-solid reactions are produced by supplying a reactive component to production vessel, then integrating (mixing) the reactive component with an aqueous fluid to form a wet reactive component. A clay substrate is supplied to the production vessel in a ratio varying from 40-60 parts per 100 parts with the balance occupied by the reactive component. The clay substrate and the wet reactive component are mixed to produce a solid composite comprising a reactive component particle encapsulated by the clay substrate. The solid composite is then calcined at a temperature above about 1200° C. such that the clay substrate vitrifies to form a vitrified clay outer layer encapsulating the reactive component. The pellets produced may have a final a mean diameter ranging from about 50 μm to about 5 mm. The solid pellets may be used as catalysts, sorbents, oxygen carriers, and the like.

The method of producing vitrified clay-metal oxide pellets disclosed is further demonstrated and described in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of methods of preparing solid pellets through the encapsulation of the reactive components using an outer layer of vitrified clay. The resulting solid pellets may be catalysts, oxygen carriers, sorbents, and the like, for use in reactor operations, particularly on fluidized bed, circulating fluid bed, transport bed, and moving bed reactor operations.

The present invention provides a method of solid pellets having high attrition resistance for use in gas-solid reactions in fluidized bed reactor operations. The pellets are comprised of one or more particles of reactive components substantially encapsulated within a layer of semi-porous vitrified material. These substantially encapsulated solid pellets exhibit stable reactivity and mitigate attrition issues in comparison to the sole reactive components.

Figure 1A:
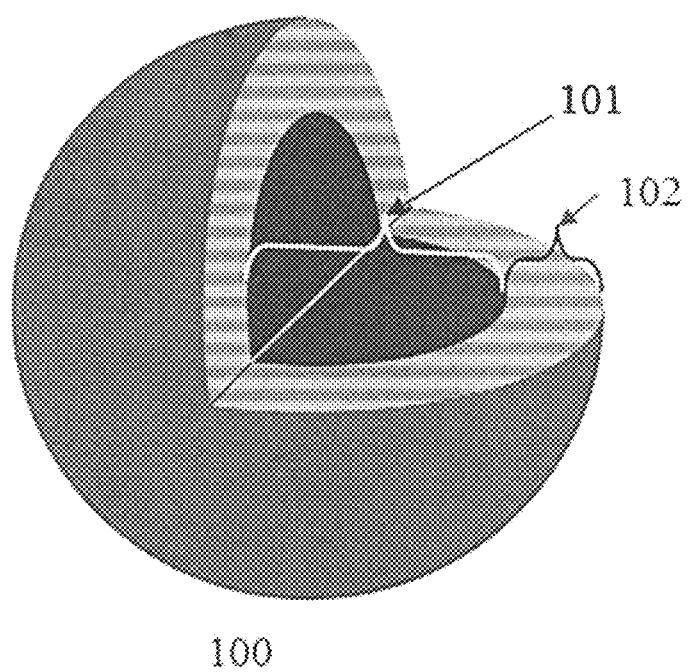
FIG. 1A depicts a cross section of a solid pellet comprising a single oxygen carrier particle encapsulated within vitrified clay.
Figure 1B:
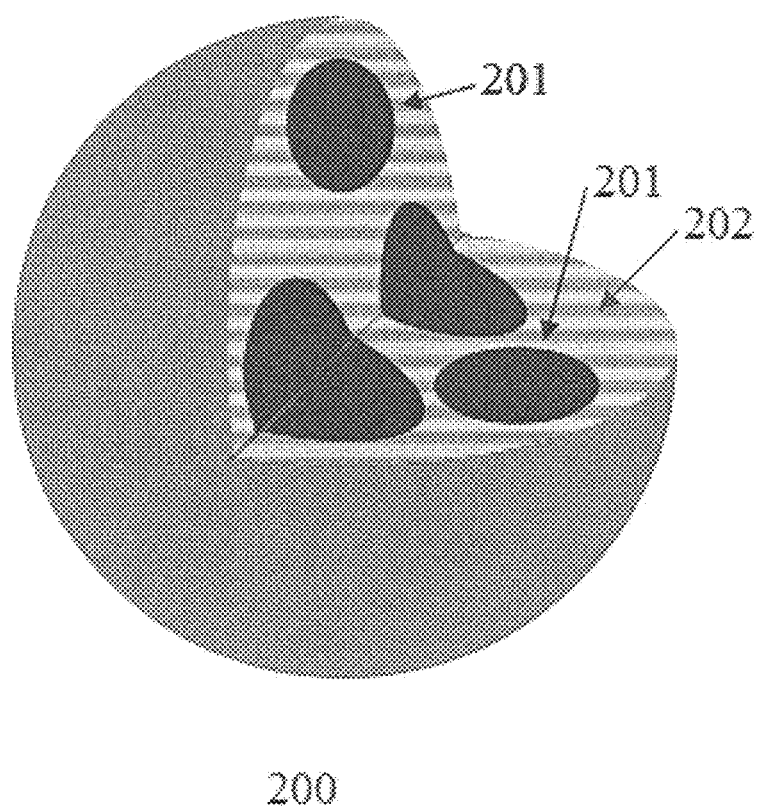
FIG. 1B depicts a cross section of a solid pellet comprising a plurality of oxygen carrier particles encapsulated with vitrified clay.

FIG. 1A illustrates a first embodiment of a solid pellet 100. The solid pellet 100 includes a single particle of reactive component such as active metal oxide 101 substantially encapsulated by an outer layer of semi-porous encapsulation material 102. FIG. 1B illustrates an alternate embodiment of a solid pellet 200. The solid pellet 200 includes a plurality of reactive component particles 201 substantially encapsulated by semi-porous encapsulation material 202.

Reactive components comprise active metal oxides, transition metal oxides, alkali earth metal oxides, or a mixture thereof. Mixtures can exists in various complex phases and stoichiometries that deviate from the base oxides used to generate the mixtures. In a preferred embodiment, the reactive component is an active metal oxide comprised of $CuO$—$Fe_2O_3$—$Al_2O_3$ in which stoichiometric ratios result in the formation of complex oxides such as reactive component in this embodiment, $CuFeAlO_4$.

The encapsulation material is a clay substrate. The clay substrate is semi-porous, unreactive and prepared by vitrification of aluminosilicate-containing clay materials. Vitrified clay provides strength to the pellet and the semi-porous nature of this outer layer allows the fluids to freely diffuse though the outer layer without affecting the reaction rate. The clay substrate is an aluminum phyllosilicate and may be selected from ball clay, fuller's earth, kaolin, attapulgite, palygorskite, saponite, common clay, fire clay, or a mixture thereof. Preferably, the clay substrate is comprised of kaolinite. When natural clays, such as kaolin, are heated above 1200° C., they may transform into a vitrified glassy multi-component structure. The clay substrate is present in a ratio to ratio from 1:1 to about 1.7:1 of the reactive component to the clay substrate by weight.

The high temperature vitrification of clays produces a strong layer of porous glassy substance consisting of $SiO_2$ and γ-alumina interweaved, strengthening the rigid amorphous $SiO_2$ network. Reaction [1] illustrates the conversion of kaolinite ($Al_2Si_2O_5(OH)_4$) to mullite ($Al_6Si_2O_3$) and quartz ($SiO_2$) during the vitrification process.

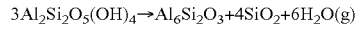

$$3Al_2Si_2O_5(OH)_4 \rightarrow Al_6Si_2O_3 + 4SiO_2 + 6H_2O(g) \qquad [1]$$

Mullite has a needle like structure and combined with silica it provides strength while maintaining porosity of the structure, facilitating gas diffusion.

The temperature of the vitrification relates to ceramic chemical composition. If the ratio of silica and alumina with low basic materials such as sodium and calcium is adjusted, the needle shape mullite forms at about 1200° C. and the needles will interlock. This mechanical interlocking contributes to the high mechanical strength. Mullite's high thermal stability and favorable properties (e.g., low thermal expansion, conductivity, high creep resistance, corrosion stability) together with suitable strength and fracture toughness make it preferred for improving attrition resistance of pellets.

In one embodiment, highly attrition resistant solid pellets are produced by supplying a reactive component, where supplying includes delivering or placing into a vessel appropriate for carrying out the production method. The reactive component undergoes integrating (mixing) with a fluid to then form a wet reactive component. A clay substrate is supplied in a ratio of varying from 1:1 to about 1.7:1 reactive component to clay substrate by weight. The clay substrate and the wet reactive component undergo mixing to produce a solid composite having a reactive component particle encapsulated by the clay substrate. The clay substrate powders and the reactive components may be mixed into the solid-solid heterogeneous mixture using any means known in the art including, but not limited to: static mixers, shaker-mixers, V-blenders, and the like. In an alternate embodiment, other techniques such as deposition of clay on the metal oxide granules may also be used. The solid composite is then calcined at a temperature above about 1200° C. such that the clay substrate vitrifies to form a vitrified clay outer layer encapsulating the reactive component. Final solid pellet size ranges in mean diameter from about 50 μm to about 5 mm. The pellets may be used as catalysts, sorbents, oxygen carriers, and the like.

Within this disclosure, the term "mean diameter," when referring to substrate granules, means an equivalent spherical diameter such as a Sauter mean diameter determined by means known in the art such as sieving, microscopy, sedimentation, permeametry, laser diffraction, or other means, or as reported by a manufacturer (see Martin Rhodes, *Introduction to Particle Technology* ($2^{nd}$ ed. 2008)).

In one embodiment, highly attrition resistant solid pellets for fluid-solid reactions are produced by supplying a reactive component, where supplying is delivering or placing into a vessel appropriate for carrying out the production method. The reactive component undergoes integrating (mixing) with a fluid to then form a wet reactive component. A clay substrate is supplied in a ratio of varying from 1:1 to about 1.7:1 reactive component to clay substrate by weight. The clay substrate and the wet reactive component undergo mixing to produce a solid composite having a plurality reactive component particles encapsulated by the clay substrate. The solid composite is then calcined at a temperature above about 1200° C. such that the clay substrate vitrifies to form a vitrified clay outer layer encapsulating the reactive component. Final solid pellet size ranges in mean diameter from about 50 μm to about 5 mm. The pellets may be used as catalysts, sorbents, oxygen carriers, and the like.

In another embodiment, solid oxygen carrier pellets are produced by supplying an oxygen carrier where the oxygen carrier has a mean diameter. In a preferred embodiment the reactive component is an oxygen carrier including reactive metal salts selected from transition metals, group I metals, group ii metals, or a combination thereof. In a more preferred embodiment, the oxygen carrier comprises CuO, Mn oxide, iron oxide. The method provides supplying a clay substrate where the clay substrate has a mean diameter lower (smaller) than the oxygen carrier particle size. In a preferred embodiment, the clay substrate has a mean diameter less than 50 μm and the mean diameter of the oxygen carrier is in range from about 75 μm to about 500 μm. In another preferred embodiment, the mean diameter of the clay substrate is less than about 20 μm and the mean diameter of the oxygen carrier is in a range from about 50 μm to about 125 μm. The oxygen carrier and clay substrate are then mixed to form a dry mixture. The dry mixture is then integrated with a fluid to produce a granule. The granule are calcined at a temperature above about 1200° C. to vitrify the clay substrate, such that the clay substrate forms a vitrified clay outer layer encapsulating the reactive component.

In another embodiment, a solid oxygen carrier pellet is produced. The method provides supplying an oxygen carrier, integrating a fluid with the oxygen carrier to form oxygen carrier granule where the granule has a mean diameter greater than about 50 μm. A clay substrate is supplied where the clay substrate has a mean diameter lower than that of the oxygen carrier granules. The oxygen carrier granules are then mixed with the clay substrate. A fluid is integrated to the mixture to produce pellets of solid-solid heterogeneous granules, which are then calcined above 1200° C. to vitrify the clay substrate, such that the clay substrate vitrifies and forms a vitrified clay outer layer.

In another embodiment, the solid pellets further comprise an inert binder. The inert binder may be alumina, silica, magnesium oxide, zirconia, titania, or combinations thereof. In incorporating an inert binder, the reactive components are mixed with the inert binder to form a pellet. The pellet is then calcined. After calcination of the pellets containing reactive components and the binder, the pellets are mixed with clay substrates and calcined above 1200° C. to obtain the vitrified clay layer outer coating with encapsulated active metal oxide components.

The weight ratio of reactive component to clay substrate may range from about 1:1 to about 1.7:1. In a preferred embodiment, the ratio of reactive component is 1.5:1. The result is pellets containing encapsulated reactive material with an outer layer of vitrified clay. In an alternate embodiment, the ratio of reactive component to clay is 6 to 4 and the calcination temperature is 1285° C.

In another embodiment, oxygen carrier solid pellets are prepared using CuO, $Fe_2O_3$ and alumina as the reactive component. A sufficient amount of water is integrated with the oxygen carrier to produce oxygen carrier granules. Clay substrate was mixed with the oxygen carrier granules to the generate solid-solid heterogeneous granules. The solid-solid heterogeneous granules undergo calcination at about 1285° C. to obtain a pellet having a strong outer layer of vitrified clay. In an alternate embodiment, the oxygen carrier is first mixed with the clay substrate, then a sufficient amount of liquid is added to generate solid-solid heterogeneous granules. The resulting granules are then vitrified.

In another embodiment, a reactive component has a mean diameter greater than that of the clay particles. The porous clay particles have a mean diameter of less than about 20 μm, preferably less than 5 μm. The reactive component has a mean diameter of more than 50 μm, preferably more than 75 μm. In an alternate embodiment the clay substrate has a mean diameter less than 50 μm and an oxygen carrier reactive component has a mean diameter of between 75 μm to 500 μm. In another alternate embodiment, the mean diameter of the clay substrate is less than 20 μm and the mean diameter of the oxygen carrier is 50 μm to 125 μm.

The oxygen carriers may be transported between an air reactor and a fuel reactor during operation and the development of oxygen carriers with high attrition resistance is critical for the success of the operation. The described method to prepare pellets provides oxygen carriers with high attrition resistance for use in reactor operations, including but not limited to fluidized bed, circulating fluid bed and moving bed reactor operations. The reactive materials are encapsulated using a porous unreactive strong outer layer that is prepared by vitrification of aluminosilicate containing clay materials, which provides strength to the pellet and allows the fluids to freely diffuse though the outer layer without affecting the reaction rate. This oxygen carrier pellet exhibits stable reactivity and noticeably mitigates the attrition issue, as compared to the oxygen carrier without encapsulation.

Example

In one embodiment, the method disclosed provides for the preparation of an oxygen carrier for chemical looping combustion. The active metal oxide components of the oxygen carrier are comprised of copper oxide, iron oxide and aluminum oxide. Combination of the base oxides in desired stoichiometric ratios results in the formation of a cubic spinel oxide structure, $CuFe_{2-x}Al_xO_4$. In this embodiment the stoichiometric ratio of x=1 was used, resulting in $CuFeAlO_4$ as the active metal oxide component. The active metal oxide components are encapsulated with kaolinite and calcined above 1200° C. to form a pellet having an outer layer of vitrified clay.

A solid pellet comprising the active metal oxide material $CuFeAlO_4$ as the reactive component, was prepared by agglomeration of CuO, $Fe_2O_3$ and alumina powders with water in a rotary mixer. The mean diameter of the agglomerate containing $CuFeAlO_4$ was from about 53 µm to 177 µm. The clay material used to prepare the semi-porous encapsulation material 102 is Kaolinite Type Alumina-Silicate (Halloysite form).

The oxygen carrier solid pellet 100 was prepared using an Eirich mixer/pelletizer. The mass of reactive material $CuFeAlO_4$ supplied was 720 g (60.00 wt. %) and the mass of encapsulating clay substrate supplied was 480 g (40.00 wt. %). The dry powders were mixed, then 225 ml of de-ionized water was integrated with the solid mixture in 50 ml portions in the rotating Eirich mixer to produce a pellet.

After pellets were formed, they were placed in a crucible and calcined by heating to 1285° C. at 2° C./min and held for 2 hrs. in air to form the vitrified clay. The solid pellets were sieved to obtain a preferred 180-600 µm range particle size. The encapsulation method to prepare an oxygen carrier pellet was found to have improved the attrition resistance without restricting the gas diffusion to the bulk of the pellet for the reaction as demonstrated by the following test results.

Figure 2A:
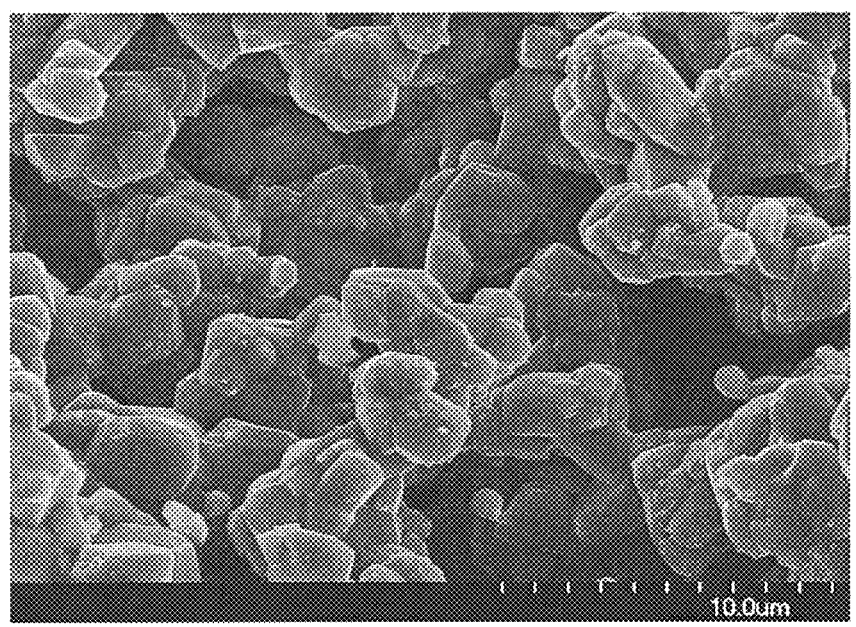
FIG. 2A depicts a scanning electron photomicrograph of a $CuO$—$Fe_2O_3$—$Al_2O_3$ oxygen carrier before encapsulation.
Figure 2B:
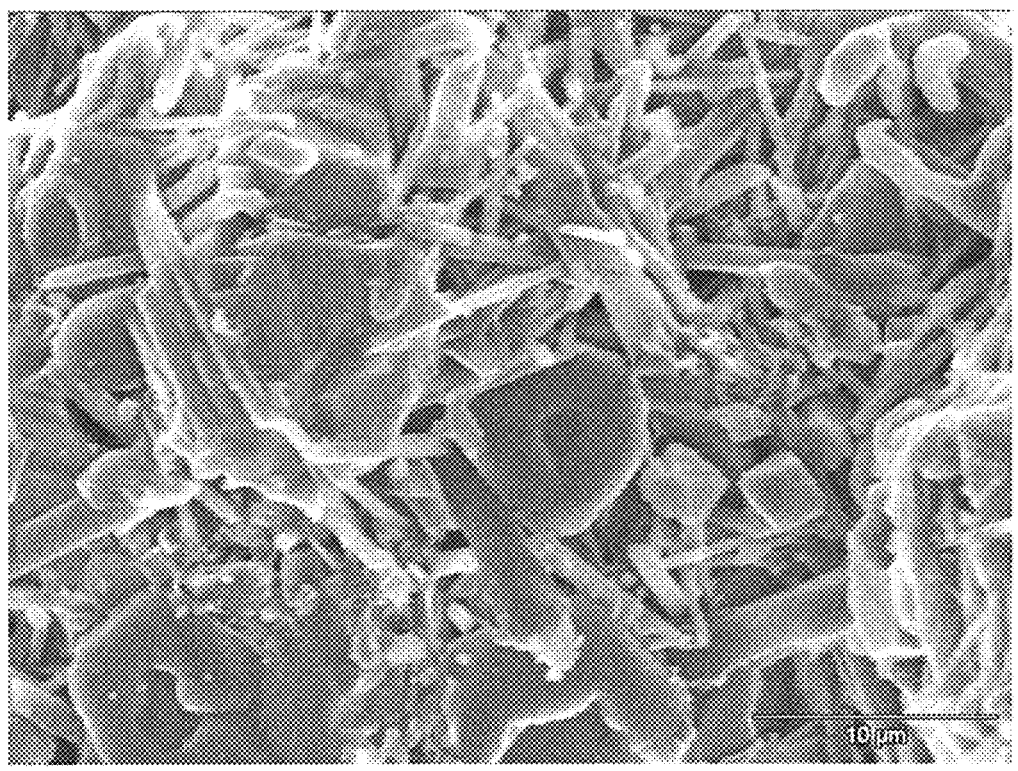
FIG. 2B depicts a scanning electron photomicrograph of a $CuO$—$Fe_2O_3$—$Al_2O_3$ oxygen carrier after encapsulation.

FIG. 2A depicts an SEM photomicrograph of the $CuFeAlO_4$ before encapsulation. FIG. 2B depicts an SEM photomicrograph of solid pellet after encapsulation. The surface morphology changed substantially after encapsulation with the vitrified clay. The encapsulated material, depicted in FIG. 2B, shows needle like structure, indicating mullite formation from vitrified clay.

The solid pellets, being oxygen carriers encapsulated within vitrified clay, were tested in a fluidized bed reactor which consists of an 11.4 cm tubular reactor with a 5.48 cm ID liner. A mass spectrometer was used for continuous online analysis of the effluent. 300 g of oxygen carrier was loaded into the reactor and heated to 800° C. A gas mixture containing $CH_4/Ar/N_2$ was used for reduction and air was used for oxidation reaction. Particle fines due to attrition during the test were collected using filters.

A sample of the pellets was placed in a TA Instruments Thermal Analysis System Q 600 SDT and methane was introduced to the sample at ambient temperature and a temperature ramp was conducted (20° C./min) from up to 900° C. in 20 vol. % $CH_4$. Mass changes were measured to estimate the total oxygen transfer capacity and reaction initiation temperature.

Isothermal TGA analysis was conducted using TGA-TA Model Q500. The sample was initially heated to 800° C. in air. After purging with Argon for 15 minutes, 20 vol. % $CH_4$ was introduced for 2 minutes for reduction. After purging with Argon, air was introduced for 20 minutes for oxidation. Reduction and oxidation cycles were repeated for 25 cycles. Weight change was measured as a function of time to estimate total oxygen transfer capacity and to evaluate reaction rate maxima.

Figure 3A:
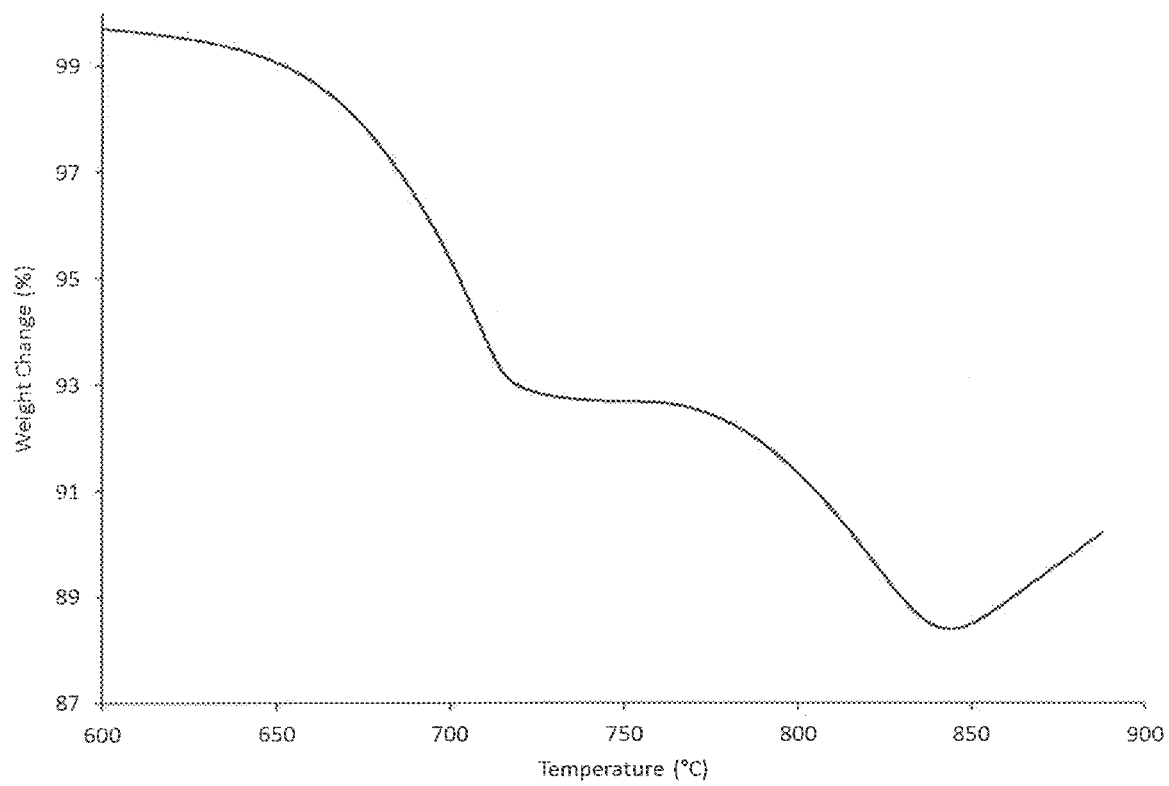
FIG. 3A depicts a graph illustrating the temperature programmed reduction in methane data of $CuO$—$Fe_2O_3$—$Al_2O_3$ before encapsulation.
Figure 3B:
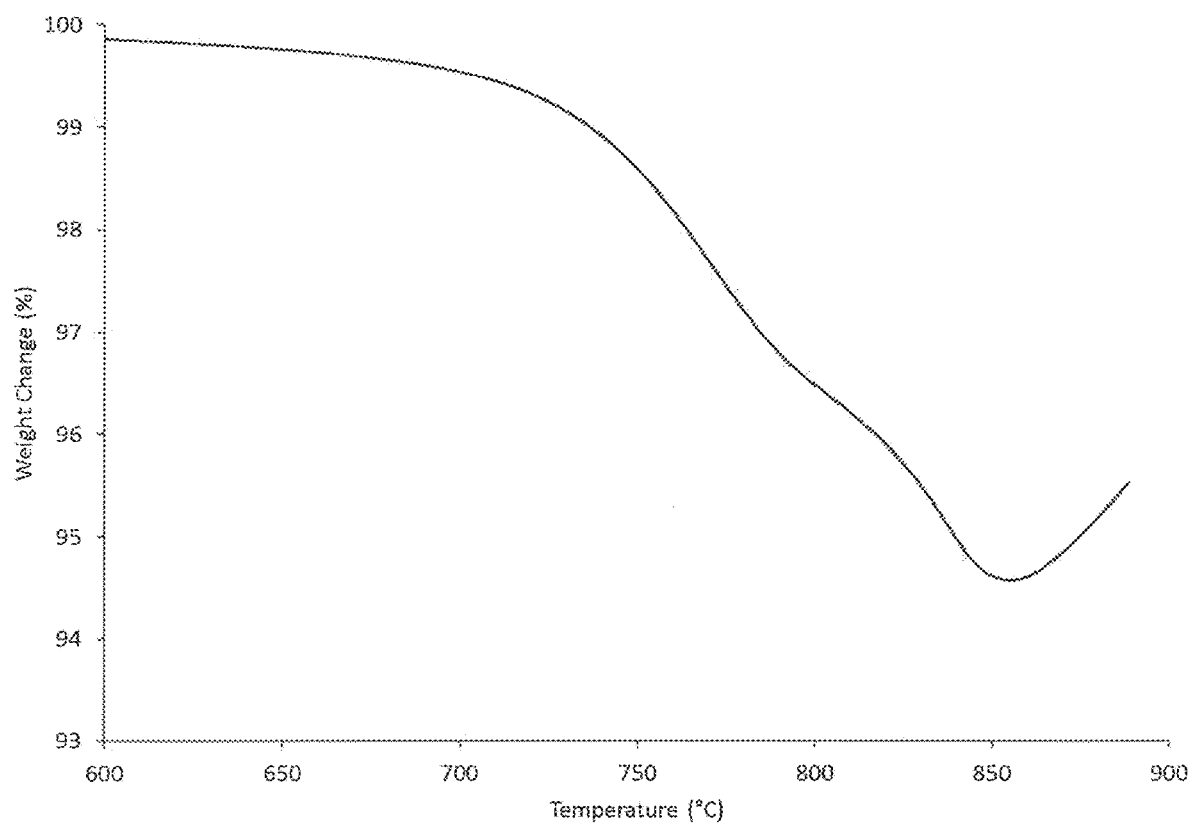
FIG. 3B depicts a graph illustrating the temperature programmed reduction in methane data of $CuO$—$Fe_2O_3$—$Al_2O_3$ after encapsulation.

FIG. 3A depicts a graph of temperature-programmed reaction data with methane during the temperature ramp from ambient to 900° C. for fresh non-encapsulated $CuFeAlO_4$. FIG. 3B depicts a graph of the temperature-programmed reaction data with methane during the temperature ramp from ambient to 900° C. for fresh encapsulated $CuFeAlO_4$. The reaction profiles were similar with both fresh and encapsulated $CuFeAlO_4$, but the total oxygen transfer capacity is higher with the fresh material. Oxygen transfer capacity of the encapsulated material was about 66% of the original. The encapsulated material had 66% of the active $CuFeAlO_4$ and 34% of inert vitrified clay. The data indicates that all the active components of $CuFeAlO_4$ in the encapsulated pellet was accessible to the gas phase reductant and the vitrified clay layer did not appreciably inhibit the gas transfer.

Figure 4:
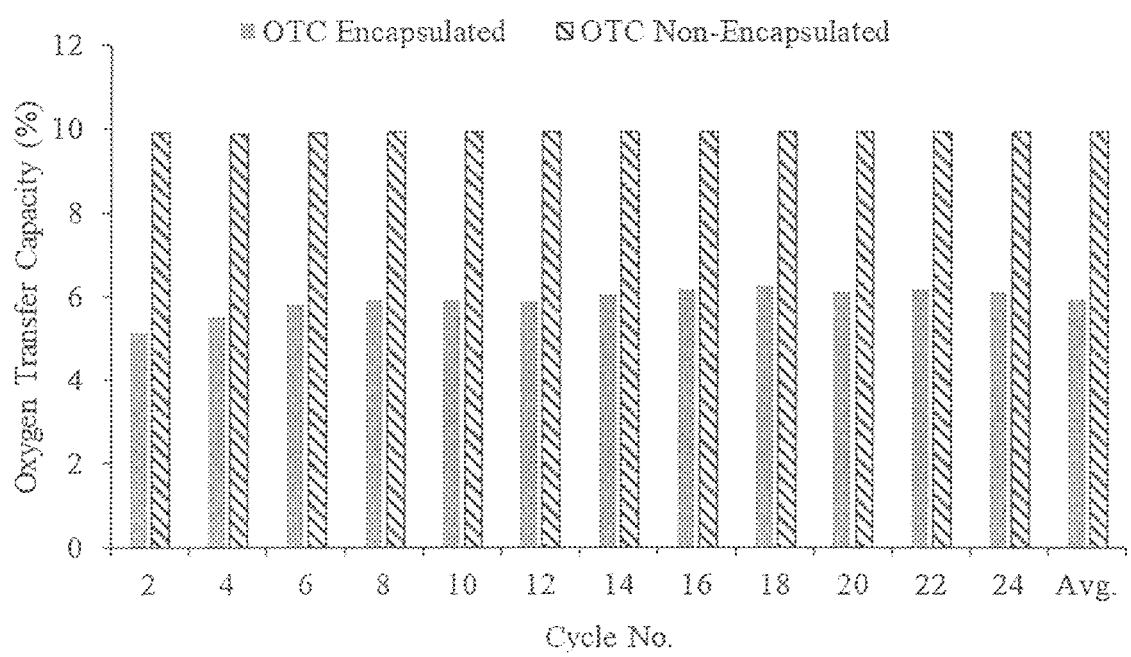
FIG. 4 depicts a graph illustrating a TGA reaction data comparison of encapsulated material versus non-encapsulated oxygen carrier material.

FIG. 4 depicts a graph of the results of a 25 cycle TGA test conducted at 800° C. with 20% $CH_4/Ar$. Oxygen transfer capacity determined by isothermal TGA tests at 800° C. for $CuFeAlO_4$ was 9.92%. A stable performance with reduction (methane)/oxidation (air) was observed during the 25-cycle test, as shown in FIG. 4.

Figure 5:
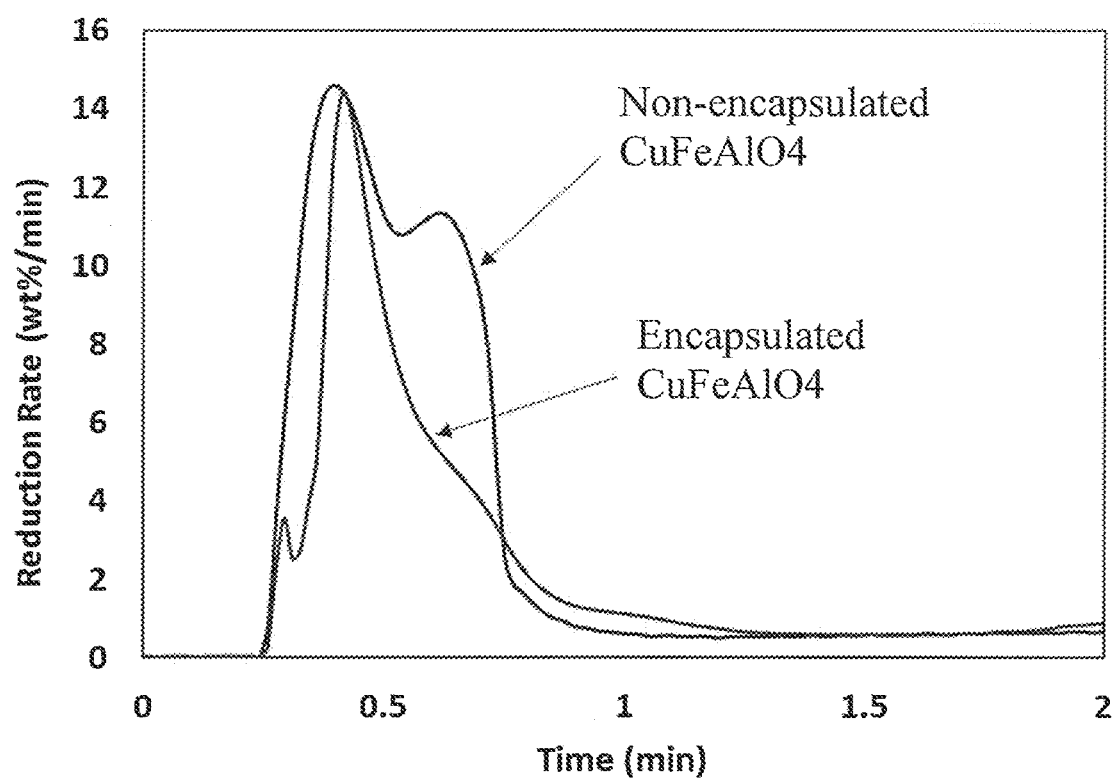
FIG. 5 depicts a graph illustrating the reduction rate comparisons of encapsulated vs non-encapsulated oxygen carrier material.

FIG. 5 depicts a graph comparing the reduction rates for non-encapsulated $CuFeAlO_4$ and encapsulated $CuFeAlO_4$. The rate of oxygen transfer was calculated by differentiating the isothermal TGA mass data. The rate peak maxima for the $CuFeAlO_4$ before and after encapsulation were similar.

Figure 6:
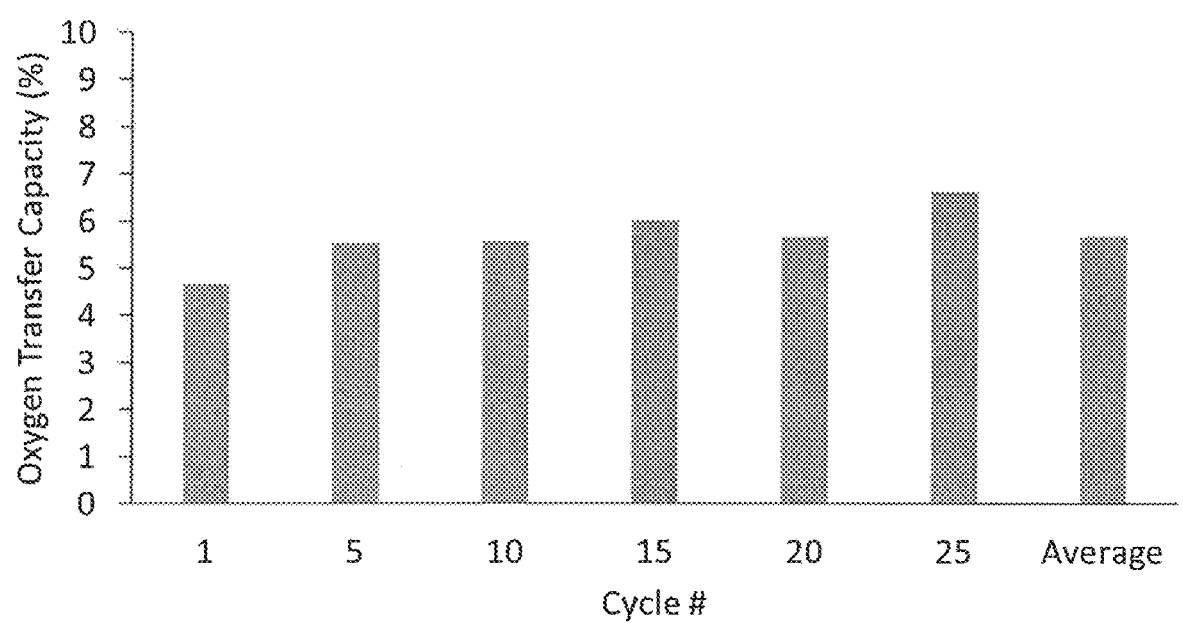
FIG. 6 depicts a graph illustrating oxygen transfer capacity data of encapsulated oxygen carrier material during 25 cycle tests at 800° C. in the fluidized bed reactor.

FIG. 6 depicts a graph of the oxygen transfer capacity data during the 25-cycle methane reduction/air oxidation tests at 800° C. with encapsulated $CuFeAlO_4$. A stable performance with no deactivation was observed. The data are consistent with the TGA data.

Figure 7:
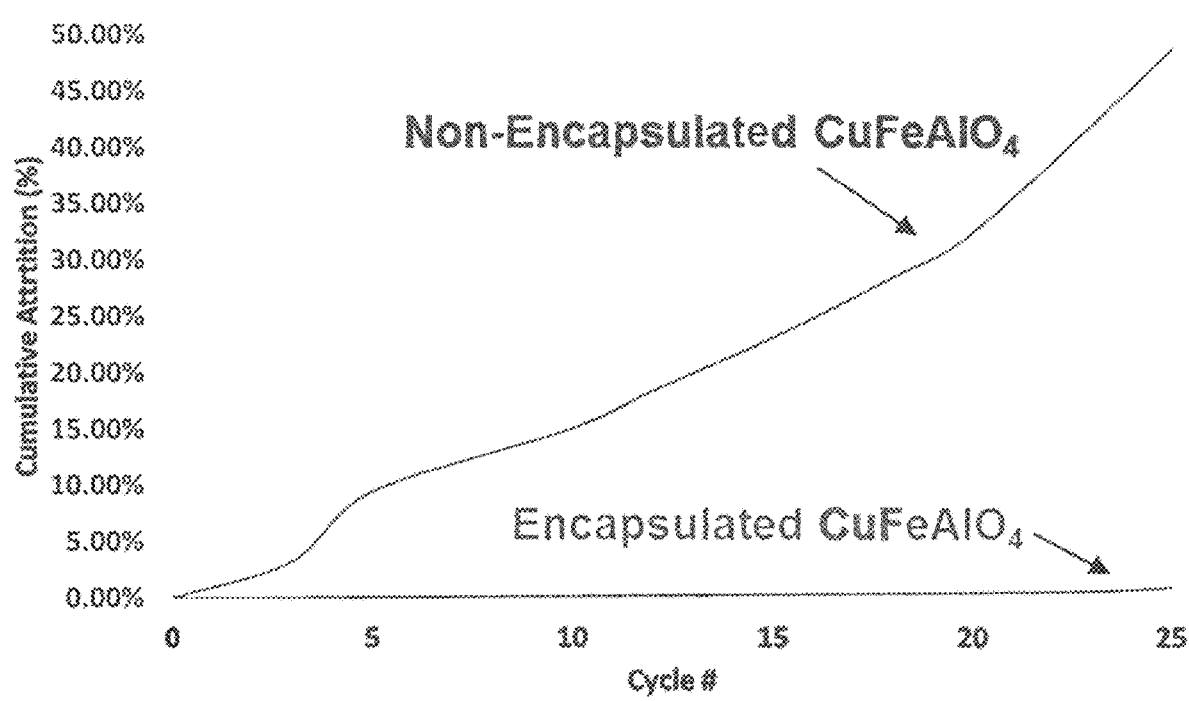
FIG. 7 illustrates attrition based on fines collected in the fluidized bed reactor.

FIG. 7 depicts a graph of the percentage of attrition determined using the amount of fines collected during the 25-cycle methane reduction-air oxidation fluidized bed tests with $CuFeAlO_4$ encapsulated with vitrified clay. For comparison, the attrition data during the 25-cycle test with un-encapsulated original $CuFeAlO_4$ is also shown in FIG. 7. The data indicates that the amount of attrition based on the fines collected during the 25-cycle test was significantly lower when the oxygen carrier was encapsulated with the vitrified clay layer as in the solid pellet.

Attrition tests were performed using the ASTM-5757-95 jet attrition method. According to the ASTM procedure, 50 g of the material with particle size of 100-150 µm was placed in the attrition unit and tested for 5 h. Attrition was performed by flowing 10 SLPM of humidified air through three 0.0397 cm orifices. Air was humidified by passing the air stream through a 500-ml 316 stainless steel water bubbler. The effluent of the attrition unit was passed through a 2-lm filter, which captures the fine particles generated due to attrition of the material. This filter was weighed both prior to testing and after the 1st, 3rd, and 5th hour of testing. The attrition index (AJI) is defined in Equation (1).

$$AJI_{n=1,3,5\ h} = (\text{Cumulative mass of fines/Initial mass of the sample})*100 \qquad (1)$$

Figure 8:
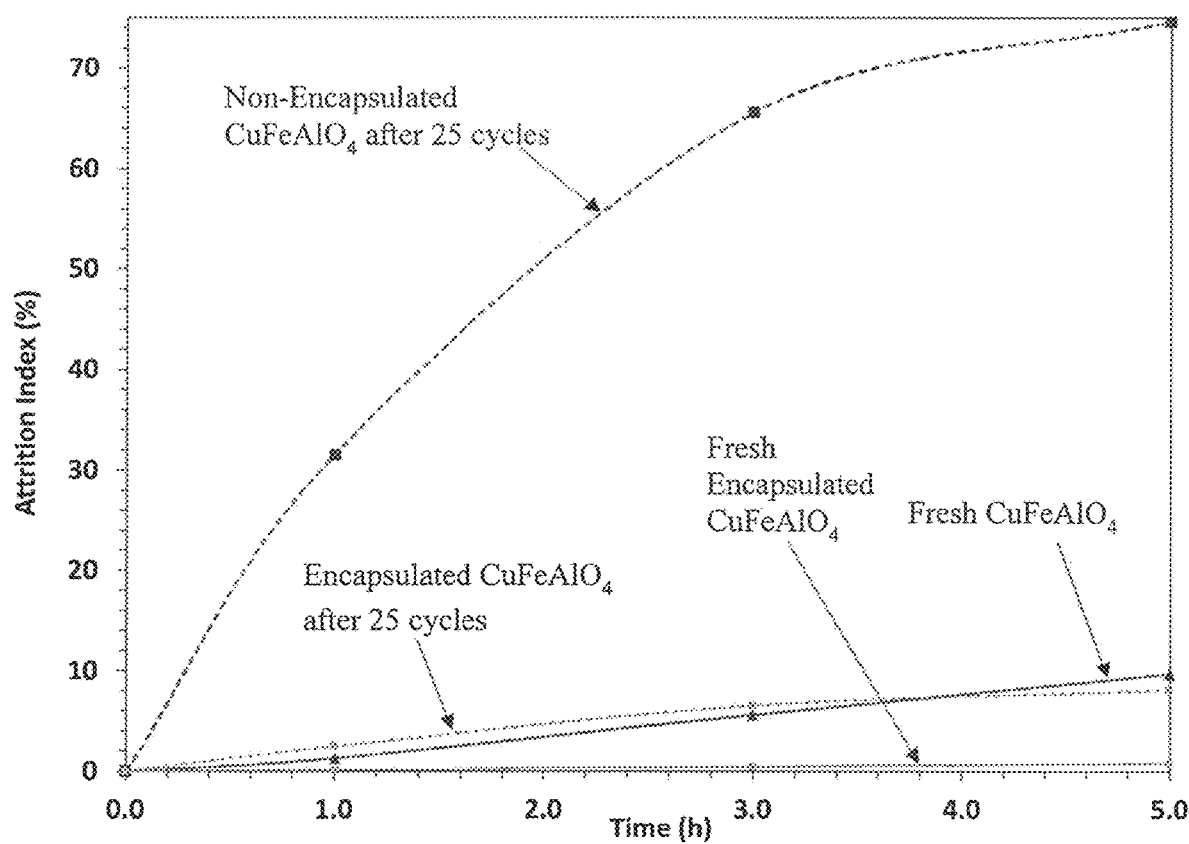
FIG. 8 depicts a graph illustrating ASTM attrition performance comparison of encapsulated material vs non-encapsulated oxygen carrier material.

The oxygen carrier material properties change during the continuous oxidation and reduction cycles at high temperature (800° C.). Due to these changes, the attrition resistance of the oxygen carrier also changed after the 25-cycle test. FIG. 8 depicts a graph of the attrition index measured for both unencapsulated and encapsulated $CuFeAlO_4$ samples before and after 25 cycles. The attrition index was measured using the ASTM 757-95 method of fresh sample and after 25-cycle tests for both $CuFeAlO_4$ samples (before and after encapsulation).

The attrition index of original un-encapsulated oxygen carrier after the 25-cycle test was significantly higher than that with the unreacted material, as shown in FIG. 8. This indicates there were substantial changes in un-encapsulated oxygen carrier pellet strength during the reduction-oxidation reactions and the strength of the pellet decreased due to reactions leading to higher attrition. However, the changes in the attrition index after the 25-cycle test were significantly lower when the pellet was encapsulated with the vitrified clay layer, as shown in FIG. 8. The attrition resistance of the solid pellets improved substantially by encapsulating with vitrified clay and the reactions had a minimal effect on the attrition resistance when the pellets were encapsulated.

Figure 9A:
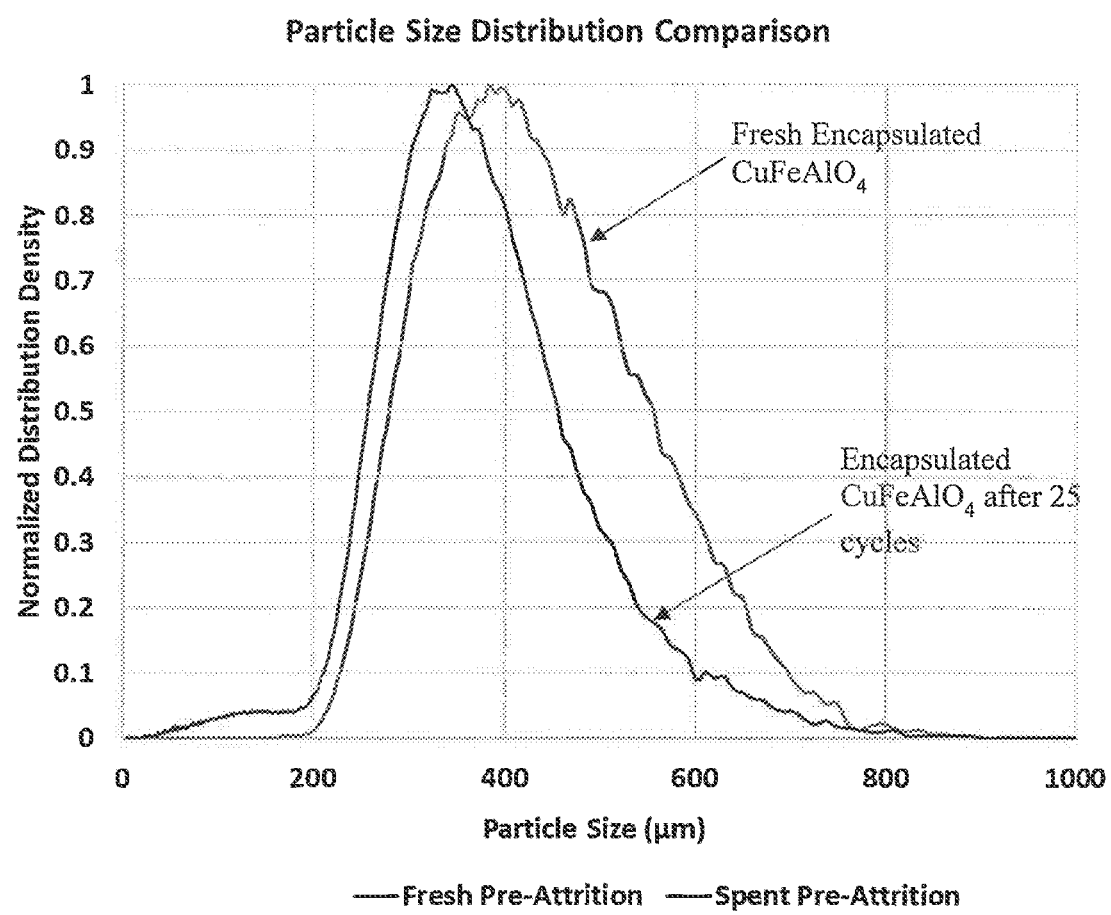
FIG. 9A depicts a graph illustrating comparison of particle size analysis of pre-25 Cycle Tests of encapsulated material vs non-encapsulated oxygen carrier material.
Figure 9B:
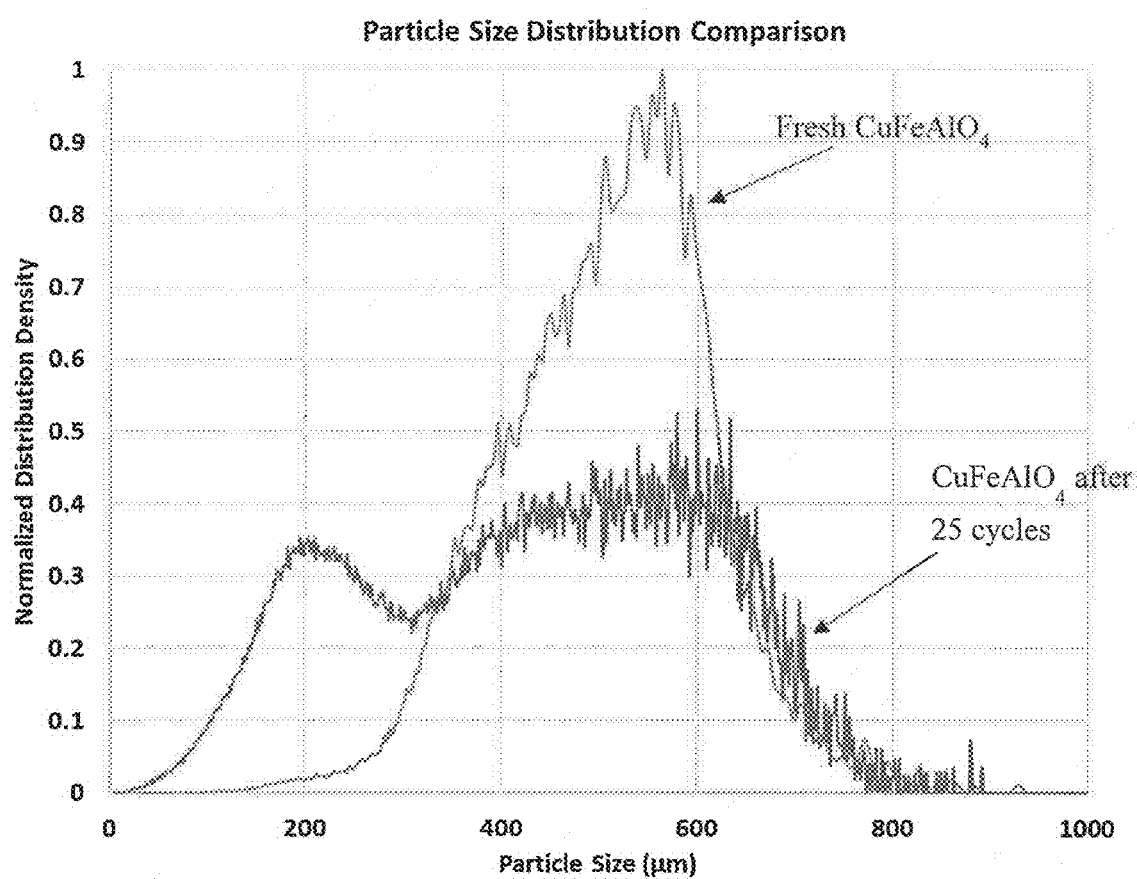
FIG. 9B depicts a graph illustrating comparison of particle size analysis of post 25 Cycle Tests of encapsulated material vs non-encapsulated oxygen carrier material.

Particle size analysis was conducted with both unreacted samples and reacted samples after the 25-cycle fluidized bed tests. FIG. 9A depicts a graph of the particle size distribution of encapsulated $CuFeAlO_4$ before and after 25 cycles. FIG. 9B depicts a graph of the particle size distribution of un-encapsulated $CuFeAlO_4$. The encapsulated particles showed a slight shift to a mean diameter with minimal change in the profile while the un-encapsulated material showed drastic changes in the mean diameter profile. The data indicates that the minimal attrition, shown in FIG. 9A, in the encapsulated material was due to surface abrasion while the drastic changes in the un-encapsulated material, shown in FIG. 9B, was due to particle erosion which involves particle chipping and fragmentation.

Figure 10:
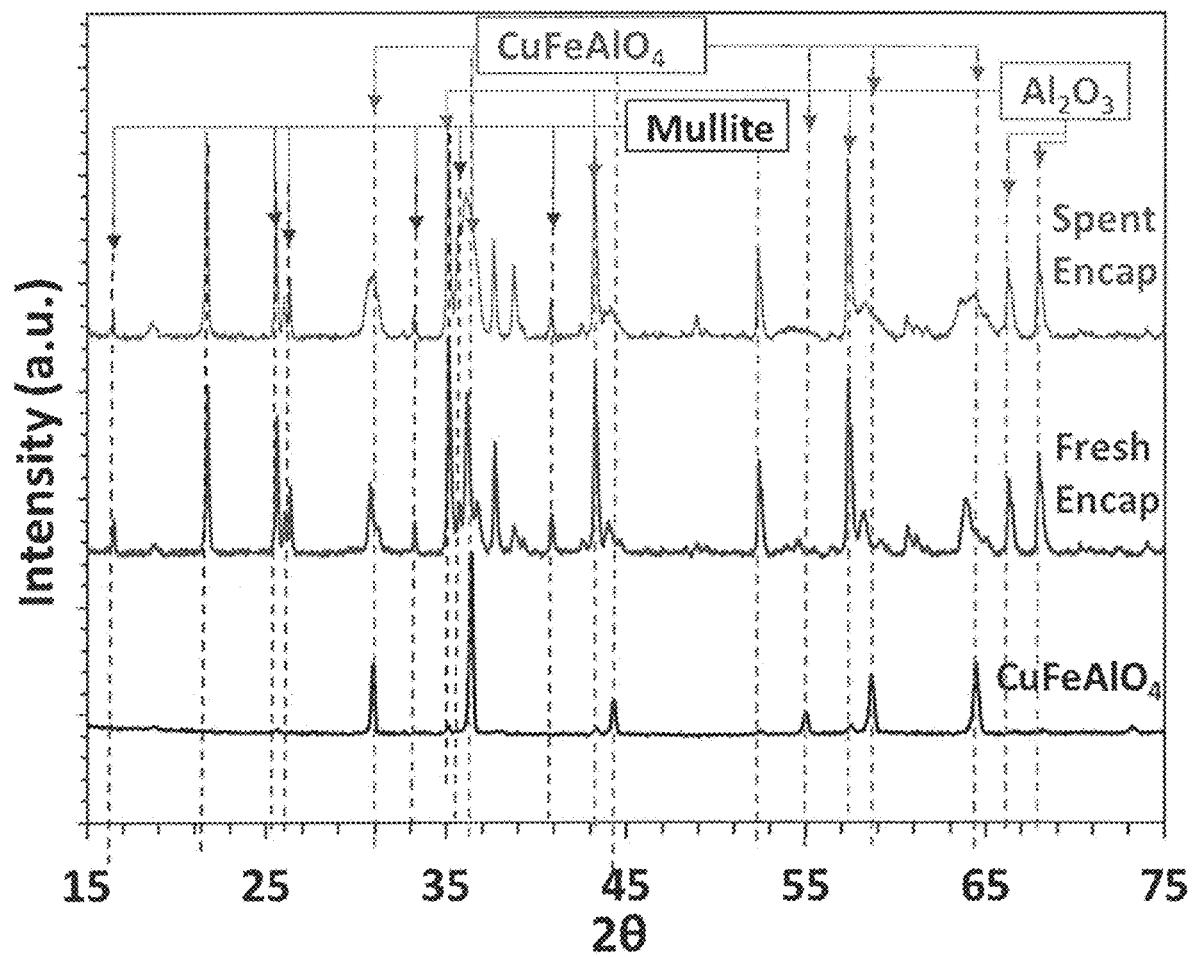
FIG. 10 depicts a graph illustrating XRD Comparisons of pre- and post-cyclic reactions of encapsulated oxygen carrier in the fluidized bed reactor.

FIG. 10 depicts a graph of X-ray powder diffraction (XRD) data of $CuFeAlO_4$ encapsulated with vitrified clay pre- and post-cycling in the fluidized bed reactor. XRD phases corresponding to mullite was observed. The XRD data after a 25-cycle reduction/oxidation the 25 cycle fluidized bed tests were very similar to that of the unreacted material, as shown in FIG. 10.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

What is claimed is:

1. A method of producing solid pellets for use in reactor operations, the method comprising:
   supplying a reactive component;
   integrating the reactive component with a fluid to form a wet reactive component;
   supplying a clay substrate;
   mixing the clay substrate and the wet reactive component, such that the reactive component is encapsulated by the clay substrate thereby producing a solid composite; and,
   calcining the solid composite at a temperature above about 1200° C., such that the clay substrate vitrifies to form a vitrified clay outer layer encapsulating the reactive component, thereby producing a solid pellet.

2. The method in claim 1 wherein the temperature is above about 1285° C.

3. The method of claim 1 wherein the solid pellet is an oxygen carrier.

4. The method of claim 3 wherein the oxygen carrier comprises CuO, Mn oxide, and iron oxide.

5. The method of claim 1 wherein the vitrified clay outer layer is semi-porous.

6. The method of claim 1, further wherein the clay substrate is ball clay, fuller's earth, kaolin, attapulgite, palygorskite, saponite, common clay, fire clay, or a mixture thereof.

7. The method of claim 1, further wherein the solid pellet has a mean diameter ranging from about 50 µm to about 5 mm.

8. The method of claim 3, further comprising mixing the oxygen carrier with an inert binder prior to mixing the oxygen carrier granules and the clay substrate.

9. A method of producing a solid pellet for a chemical looping process, the method comprising:
   supplying a reactive component having a mean diameter;
   supplying a clay substrate having a mean diameter, where the clay substrate mean diameter is lower than that of the reactive component;
   mixing the reactive component with the clay substrate to form a dry mixture;
   integrating a fluid to the dry mixture to produce a granule; and,
   calcining the granule at a temperature above about 1200° C. such that the clay substrate vitrifies to form a vitrified clay outer layer encapsulating the reactive component, thereby producing a solid pellet.

10. The method of claim 9 wherein the reactive component is an oxygen carrier.

11. The method of claim 10 wherein the oxygen carrier comprises at least one reactive metal salt selected from transition metals, group I metals, and group II metals.

12. The method of claim 11 wherein the oxygen carrier comprises CuO, Mn oxide, and iron oxide.

13. The method of claim 10 wherein the clay substrate has a mean diameter less than 50 µm and the mean diameter of the oxygen carrier is in range from about 75 µm to about 500 µm.

14. The method of claim 10 wherein the mean diameter of the clay substrate is less than about 20 μm and the mean diameter of the oxygen carrier is in a range from about 50 μm to about 125 μm.

15. The method of claim 9, further wherein the solid pellet has a mean diameter ranging from about 50 μm to about 5 mm.

16. A method of producing a solid oxygen carrier pellet for a chemical looping process comprising:
    supplying an oxygen carrier;
    integrating the oxygen carrier with a fluid to form oxygen carrier granules, where the oxygen carrier granules have a mean diameter greater than 50 μm;
    supplying a clay substrate with particle size lower than that of the oxygen carrier granules;
    mixing the oxygen carrier granules with the clay substrate to form pellets; and
    calcining the pellets at a temperature above about 1200° C. to vitrify the clay substrate, thereby producing an oxygen carrier encapsulated by a semi-porous clay outer layer.

17. The method of claim 16 further comprising mixing the oxygen carrier with an inert binder prior to mixing the mixing the oxygen carrier granules and the clay substrate.

18. The method of claim 17, further wherein the inert binder is selected from alumina, silica, magnesium oxide, zirconia, and titania.

19. The method in claim 17, further wherein the oxygen carrier comprises $CuO$ and $Fe_2O_3$ and the inert binder is alumina.

20. The method of claim 16, further wherein the solid pellet has a mean diameter ranging from about 50 μm to about 5 mm.

* * * * *